United States Patent
Dunning et al.

(10) Patent No.: US 11,455,848 B2
(45) Date of Patent: Sep. 27, 2022

(54) PRESERVING VEHICULAR RAW VIBRATION DATA FOR POST-EVENT ANALYSIS

(71) Applicant: GE AVIATION SYSTEMS LIMITED, Gloucestershire (GB)

(72) Inventors: Paul Dunning, Eastleigh (GB); Steven Bonnett, Eastleigh (GB); Timothy North, Eastleigh (GB); Daniel Lee, Eastleigh (GB)

(73) Assignee: GE AVIATION SYSTEMS LIMITED, Gloucestershire (GB)

( * ) Notice: Subject to any disclaimer, the term of this patent is extended or adjusted under 35 U.S.C. 154(b) by 101 days.

(21) Appl. No.: 16/586,793

(22) Filed: Sep. 27, 2019

(65) Prior Publication Data

US 2021/0097782 A1    Apr. 1, 2021

(51) Int. Cl.
G07C 5/08    (2006.01)
B64F 5/60    (2017.01)

(52) U.S. Cl.
CPC .............. *G07C 5/085* (2013.01); *B64F 5/60* (2017.01)

(58) Field of Classification Search
CPC . G07C 5/085; G07C 2009/00428; B64F 5/60; B64F 5/40
See application file for complete search history.

(56) References Cited

U.S. PATENT DOCUMENTS

| | | | |
|---|---|---|---|
| 6,389,340 B1 * | 5/2002 | Rayner | B60R 1/00 340/438 |
| 6,928,370 B2 | 8/2005 | Anuzis | |
| 6,983,199 B2 | 1/2006 | Mollmann | |
| 7,222,002 B2 | 5/2007 | Maine | |
| 7,328,121 B1 | 2/2008 | Leigh | |
| 8,572,009 B2 * | 10/2013 | Harris | G01H 1/00 706/12 |
| 9,080,925 B2 | 7/2015 | Schwab | |

(Continued)

FOREIGN PATENT DOCUMENTS

EP    1297313 A1    4/2003

OTHER PUBLICATIONS

European Search Report from EP Appl. No. 20184606, dated Dec. 14, 2020.

*Primary Examiner* — James J Lee
*Assistant Examiner* — Steven Vu Nguyen
(74) *Attorney, Agent, or Firm* — Wood IP LLC

(57) ABSTRACT

A system and method preserves raw vibration data for a physical event involving a transport vehicle such as a helicopter, plane, boat, car, or truck. The event may involve unexpected mechanical stresses on the vehicle. The system and method preserves raw vibration data for parts of the transport vehicle, such as from multiple points along the drive train. The preserved raw vibration data includes data from time prior to the physical event. In an embodiment, the system and method continuously detects vibration data, and stores the most recent vibration data in a circular memory buffer. The buffer is continually updated with the most current vibration data. When an event is automatically detected or manually triggered, the most recently saved vibration data is transferred from the buffer to permanent storage, along with vibration data obtained subsequent to the event. This allows for a more thorough post-event analysis.

15 Claims, 9 Drawing Sheets

(56) References Cited

U.S. PATENT DOCUMENTS

| | | |
|---|---|---|
| 9,563,580 B2 | 2/2017 | Warner |
| 10,338,554 B2 | 7/2019 | Cella |
| 10,497,355 B2 | 12/2019 | Nagai |
| 2003/0088346 A1 | 5/2003 | Calkins et al. |
| 2014/0375478 A1* | 12/2014 | Horne .................. G08G 5/0065 340/959 |
| 2017/0052150 A1* | 2/2017 | Zalameda ............ G01N 29/043 |
| 2017/0148237 A1* | 5/2017 | Iwaasa .................. B60W 50/08 |
| 2018/0047225 A1* | 2/2018 | Batcheller .............. G07C 5/008 |
| 2020/0228260 A1* | 7/2020 | Jonsson ................ H04L 1/1896 |
| 2021/0090356 A1* | 3/2021 | Golov ................. G06F 11/0796 |

* cited by examiner

Exemplary Vibration Sensor Configurations

| Accel Location ID | Long Location Description | Orientation | Accelerometer |
|---|---|---|---|
| 1 | #1 Engine Input (A1) | Radial | 2 : 10mV/g |
| 2 | #2 Engine Input (A2) | Radial | 2 : 10mV/g |
| 3 | Annulus Fwd (A3) | Radial | 2 : 10mV/g |
| 4 | Annulus Right (A4) | Radial | 2 : 10mV/g |
| 5 | Annulus Aft (A5) | Radial | 2 : 10mV/g |
| 6 | TTO O/Shaft (A6) | Radial | 2 : 10mV/g |
| 7 | TRDS Hanger (A7) | Radial | 2 : 10mV/g |
| 8 | IGB (A8) | Radial | 2 : 10mV/g |
| 9 | TGB (A9) | Radial | 2 : 10mV/g |
| 10 | M/R Lateral (MGB/A21) | Lateral | 1 : 25mV/g |
| 11 | M/R Vertical (Pilot/A20) | Vertical | 1 : 25mV/g |
| 12 | T/R Radial (A22) | Radial | 1 : 25mV/g |
| 13 | T/R Axial (A23) | Axial | 1 : 25mV/g |
| 14 | #1 Input Housing (A10) | Radial | 2 : 10mV/g |
| 15 | #2 Input Housing (A11) | Radial | 2 : 10mV/g |
| 16 | Spare 1 | Spare 1 | 4 : Unused Input |
| 17 | Spare 1 | Spare 1 | 4 : Unused Input |

- 24 – 43 Accelerometers (Rotorcraft)
- Frequency Range 0 – 60kHz
- Acquisition time - 0.01 Secs 180 Secs (slow rotating components)
- Amplitude/Acceleration – 0.001g ~300g
- Accelerometers distributed around transmission system and cabin

FIG. 3

PRESERVING VEHICULAR RAW VIBRATION DATA FOR POST-EVENT ANALYSIS

TECHNICAL FIELD

The present invention relates to analyzing data indicative of mechanical system performance for a vehicular transport system. More particularly, the present invention relates to unexpected or undesired events which may occur with a transportation vehicle; and further, to an improved system and method for storage of sensed vibration data used to support a post-event analysis of vehicular system stresses.

BACKGROUND

Modern transport vehicles (hereinafter, "vehicles") include helicopters, airplanes, cars, trucks, boats and trains. It is common for vehicles to include electronic sensors to monitor both the performance and the environment of a vehicle. A sensor may record data indicative of the environment impinging on or surrounding the vehicle, or data indicative of internal operations of parts of the vehicle, or data which is influenced by both external environment and internal operations. Commonly used sensors may include sensors for monitoring motion, vibration, velocities, temperatures, torques, liquid or gas pressures, liquid or gas volumes, concentrations of gases or liquids, electrical performance and parameters, and others as well.

The data obtained via parameter-specific sensors may be used for multiple purposes. For example, a sensor may monitor real-time performance of a vehicle component to ensure a component is operating within safe or appropriate parameters (for example, for heat, pressure, electrical performance, and similar). Where variations from expected performance ranges are detected by a sensor, a hardware processor with suitable code may be used to adjust operations of the vehicle to correct for problems. In the simplest cases, monitoring (with suitable displays) may simply alert an operator of a vehicle to changes in vehicle conditions, such as changes in vehicle speed or fuel levels, or total mileage travelled, leaving appropriate responses to the determination of the vehicle operator.

Another use of collected sensor data is for after-the-fact analysis of vehicle performance. In some cases, such after-the-fact analysis may be used to help with development of vehicle prototypes during a vehicle design process. In other cases, such data, when analyzed over time, may provide early-alert warnings to potential or pending problems for the vehicle.

Another application of sensor data is when the vehicle encounters unexpected problems or environments, or when the vehicle exhibits unexpected behaviors or performance, in order to analyze and assess vehicle performance after-the-fact. Such post-problem analysis, usually performed by researchers and/or computers some time after an event has occurred, can assist in identifying either the nature of unexpected stresses to which a vehicle was exposed; or unanticipated responses of the vehicle to various environment factors/stresses; or both.

One well-known application of vehicle sensor data is in aircraft in a variety of different systems which broadly fall under the category of "Health and Usage Monitoring/Management Systems" (HUMS). HUMS include, for example and without limitation:

(1) On-board Maintenance System (OMS)—These devices record flight data and also report any detected aircraft faults. They mainly support aircraft maintenance by mechanics. (They can be understood as analogous to the laptop computers or similar that auto mechanics may plug into automobiles to identify services problems.)

(2) Health and Usage Monitoring Systems (HUMS)—Provide aircraft mechanics and engineers with flight data information or other contextual information so that they can establish the health of aircraft components and monitor their usage.

(3) Crash-survivable Cockpit Voice & Flight Data Recorder (CVFDR) (so-called "black boxes", which in fact are typically painted orange to help in recovering them after accidents). A CVFDR is a data processing and storage device which collects and may partially process data from numerous sensors aboard an aircraft. They are typically designed with robust mechanical structure to be highly survivable following even a catastrophic plane crash or other serious incident.

(4) Quick Access Recorder (QAR)—At the end of every flight, the QAR provides for quick data download from the aircraft to off-vehicle processing systems.

While the "black boxes" may be the publicly best-known devices, it is often desirable to obtain and analyze both routine vehicular sensor data; and also desirable to sometimes obtain still additional flight data even when a vehicle has not experienced a catastrophic failure, but rather when the vehicle has simply been subject to a high risk or high stress incident, or when a pilot or other aircraft operator decides that additional data collection may prove useful during a flight. Such routine data collection is handled by the OMS and HUMS systems.

Persons skilled in the art will appreciate that on-board recording elements may include cockpit voice recorders and image/video recorders as well. In some embodiments of the present system and method, data from such devices is not within the scope of the present system and method. In alternative embodiments, some data from flight voice recorders and/or image/video recorders may fall within the scope and application of the present system and method.

For convenience in the present document, the terms "flight data recorder", "HUMS", "flight data monitoring systems", and similar terms may be used interchangeably to refer broadly to devices which collect and store information pertinent to flight operations in the course of an aircraft transit. A further umbrella-term generally employed herein is, interchangeably with these other terms, is "Data Acquisition and Processing Unit (DAPU)" (see for example FIG. 4 below).

Data Collection Volume and Limitations

Flight Data: Persons skilled in the relevant arts will appreciate that the term "flight data" encompasses a variety of data pertaining to aircraft movement, altitude and performance, aircraft systems usage (for example, fuel usage, electrical operations, and similar data), and also to the detected operations of numerous aircraft components, such as engines, wings, and other systems. The exact type and extent of data collected may vary depending on the type of aircraft employed and the choice of data collection systems. Flight data may include various levels of detail, including varying levels of time-granularity.

For purposes of the present system and method, and as used in this document, "flight data" may include data pertaining to detected aircraft vibrations, and may include raw vibration data, processed vibration data, or both.

The collection of flight data is typically limited by some practical constraints. Aircraft, such as airplanes and helicopters, often employ hundreds of sensors of many different types, and which are positioned throughout the craft, all of which collect raw data in real time. Over the duration of any typical transport time (for example, even just one hour, let alone multiple hours), the amount of real-time raw data that can be collected from even just a few sensors can spill into the terabyte range. The data from dozens or hundreds of sensors can accumulate to hundreds of terabytes or more if aircraft vibration data is included.

With modern hard drives and other storage advances, it may be practical to store all this data in a flight recorder with multiple long-term storage devices. However, it would presently be unrealistic to transfer all the raw sensor data for an entire flight to off-site storage (for off-site analysis). The data transmission time could be on the order of hours, and would use up unacceptable bandwidth on communications channels.

For this reason, flight recorders typically engage in some preliminary processing and/or compression of some flight data. Some flight data—including data which may not be typically stored in legacy systems, but which may be recorded and stored within the scope of the present system and method—may require extremely high sampling rates. For example, vibration data for mechanical components and/or structural components may need to be sampled many thousands of times per second. Therefore, a flight recorder may determine and then record to its non-volatile storage a series of time averaged values of sensed levels of vibrations (as well as other parameters, such as electrical parameters, temperatures, pressures, speeds of rotation, and other parameters). For example, a time average of mechanical vibration values per second could be determined, and then saved to long-term flight recorder storage. Other processed values, such as maximum values or minimum values within a time unit (such as per second) may be calculated and recorded as well. Alternatively, some flight data, while collected continuously, may be stored only at selected time intervals (such as once per second, or once every five seconds, etc.) This greatly reduces the amount of data which needs to be saved and later transferred to off-vehicle storage.

Potential Problem for Later Data Analysis and Current Solution

A potential problem then arises, however, for later data analysis following a flight incident, accident, or crash (hereinafter, simply "flight incident" or "incident"). To determine the cause of an accident or incident, accident investigators must consider multiple factors. To make as complete an analysis as possible, it is often desirable to obtain the raw, unprocessed sensor data, especially for the time period(s) most strongly implicated in an incident or accident. This ideally would include raw flight data for some period of time prior to the incident.

Existing data monitoring systems, such as HUMS and flight recorders, are sometimes configured to store raw data from some sensors (along with processed sensor data) once an indication has been received of an incident. However, this means that raw sensor data is not available for the moment of the incident, and is also not available for any period of time prior to the incident.

SUMMARY OF THE INVENTION

What is needed, then, is a system and method to store, in long-term or non-volatile storage, raw sensor data for a period of time prior to an incident, as well as during an incident and for some period of time following an incident, without storing an amount of data with unacceptably large storage or bandwidth requirements.

In at least one aspect, embodiments of the present system and method provide for a sensing and monitoring system (hereinafter, "monitoring system") with a volatile circular memory buffer which is coupled with multiple vibration sensors (accelerometers) in a vehicle; the system and method entails a long-term (non-volatile) storage as well (hereinafter, "storage").

The circular memory buffer continually records raw vibration data from the sensors for a designated length of time (for example, one minute, two minutes, or five minutes, or possibly other designated durations of time). As new, raw vibration data enters the circular buffer, the new data is stored in the buffer. To make room for new data, the oldest data in the buffer is overwritten (effectively erasing it).

A hardware processor is also associated with the system. The hardware processor (hereinafter, "processor") may generate processed, reduced-bandwidth vibration data based upon received raw vibration data. Under normal conditions, the raw vibration data in the circular buffer is not stored in the long-term storage, and so the long-term storage is only used to store the processed, reduced-bandwidth vibration data generated from the raw data by the hardware processor.

The monitoring system is configured to determine that an incident has occurred. The determination may be made by the present monitoring system itself, by another monitoring system of the vehicle, or by a indication received from a user of the system (such as a helicopter pilot or airplane pilot).

An exemplary monitoring system according to the present system and method may automatically determine that an incident has occurred; or the monitoring system according to the present system and method may receive a trigger signal from a pilot, so that the pilot may manually trigger vibration data acquisition when the pilot believes additional data would be useful. The monitoring system then copies the vibration data that has been collected prior to the incident or manual signal, and which is still resident in the circular buffer, to the long-term storage. Vibration data gathered post incident is also appended to the long-term storage.

In this way, the long-term memory is configured to store, for future analysis, raw vibration data from the vibration sensors which begins at some designated length of time (for example, two minutes or five minutes) before the incident, which further includes the vibration raw data at the time of the incident, and also includes the raw vibration data collected subsequent to the incident.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

BRIEF DESCRIPTION OF THE DRAWINGS

Advantageous designs of embodiment of the present invention result from independent and dependent claims, the description, and the drawing. In the following, preferred examples of embodiments of the invention are explained in detail with the aid of the attached drawings:

FIG. 3 provides in list form and tabular form exemplary types and volume of vibration data which may be collected by vibration sensors on board an exemplary helicopter.

DETAILED DESCRIPTION OF EXEMPLARY EMBODIMENTS

The following detailed description is merely exemplary in nature and is not intended to limit the system and methods, the elements or steps of the system and method, its applications, and its uses disclosed herein. Further, there is no intention for the scope to be bound or limited to or by any theory presented in the preceding background or summary, nor in the following detailed description.

Throughout the application, description of various embodiments may use "comprising" language, indicating that the system and method may include certain elements or steps which are described; but that the system and method may also include other elements or steps which are not described, or which may be described in conjunction with other embodiments, or which may be shown in the figures only, or those which are well known in the art as necessary to the function of processing systems. However, it will be understood by one of skill in the art, that in some specific instances, an embodiment can alternatively be described using the language "consisting essentially of" or "consisting of."

Sensors

Figure 1:
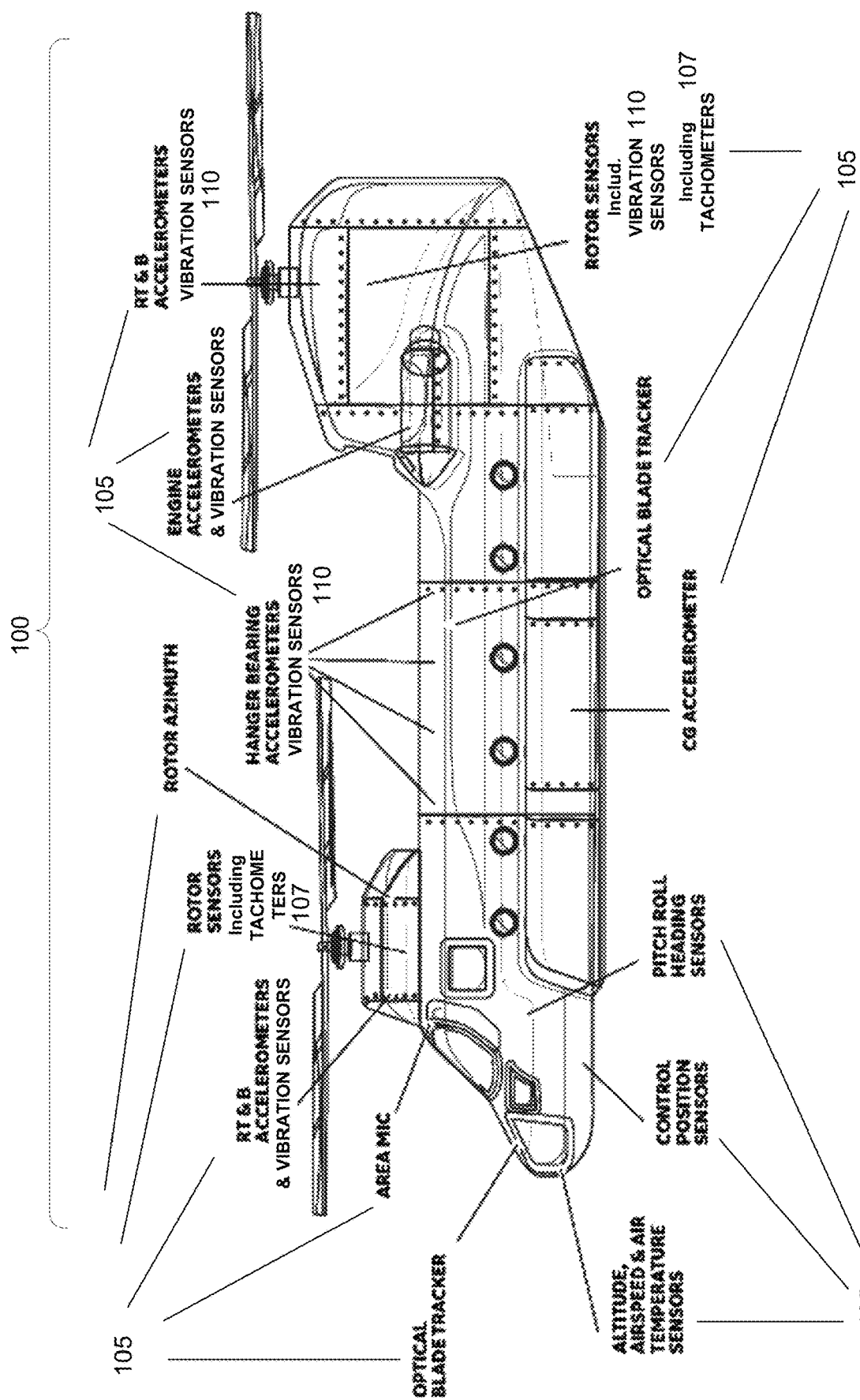
FIG. 1 illustrates an exemplary vehicular transport system ("vehicle") with exemplary sensors including vibration sensors.

FIG. 1 illustrates an exemplary vehicular transport system ("vehicle") 100, in this instance an exemplary helicopter 100. The use of a helicopter is for purposes of illustration only, and should not be construed as limiting. Numerous elements of transport vehicles in general, and helicopters in particular, are well known in the art and will not be described here.

The vehicle 100 may include a sensor or a multitude of sensors 105, typically of different types. Sensors 105, which may have elements which are electrical, mechanical, optical, and/or chemical, sense various environmental or vehicle phenomena or energies; the sensors operate in real-time to provide a time-series view of the magnitude or intensity of the phenomena they sense, the real-time data being provided as output as either raw electrical signals with varying voltages and currents, or as digital/numeric sampled data. Exemplary placements within or along the vehicle 100 of numerous exemplary sensors 105 are shown in the FIG. 1, such as those for altitude, vehicular speed, vehicular direction and orientation, temperatures, pressures, location, vehicular acceleration, and others.

Included among the sensors 105 may be vibrations sensors 110, also referred to as accelerometers 110. (Persons skilled in the art will appreciate that, as used herein, the term "accelerometer" is employed equivalently to "vibration sensors", as opposed to the types of acceleration detectors which may be employed to detect gross acceleration of the entire vehicle 100.)

In one embodiment, vibrations sensors 110 convert sensed mechanical vibrations into electrical signals whose voltages and/or current levels vary in proportion with the magnitude of sensed mechanical vibrations of mechanical and/or structural elements (hereinafter, "mechanical elements") of the vehicle 100. As shown in FIG. 1, vibration sensors 110 may be attached to or associated with numerous elements of the vehicle 100, such as rotors, rotor track and balance systems (RT&B), engines, drive trains, and various stress bearing points along the frame of a helicopter. Rotation sensors 107 may be included at points throughout vehicle 100, such as at rotors or along drive shafts.

Figure 2:
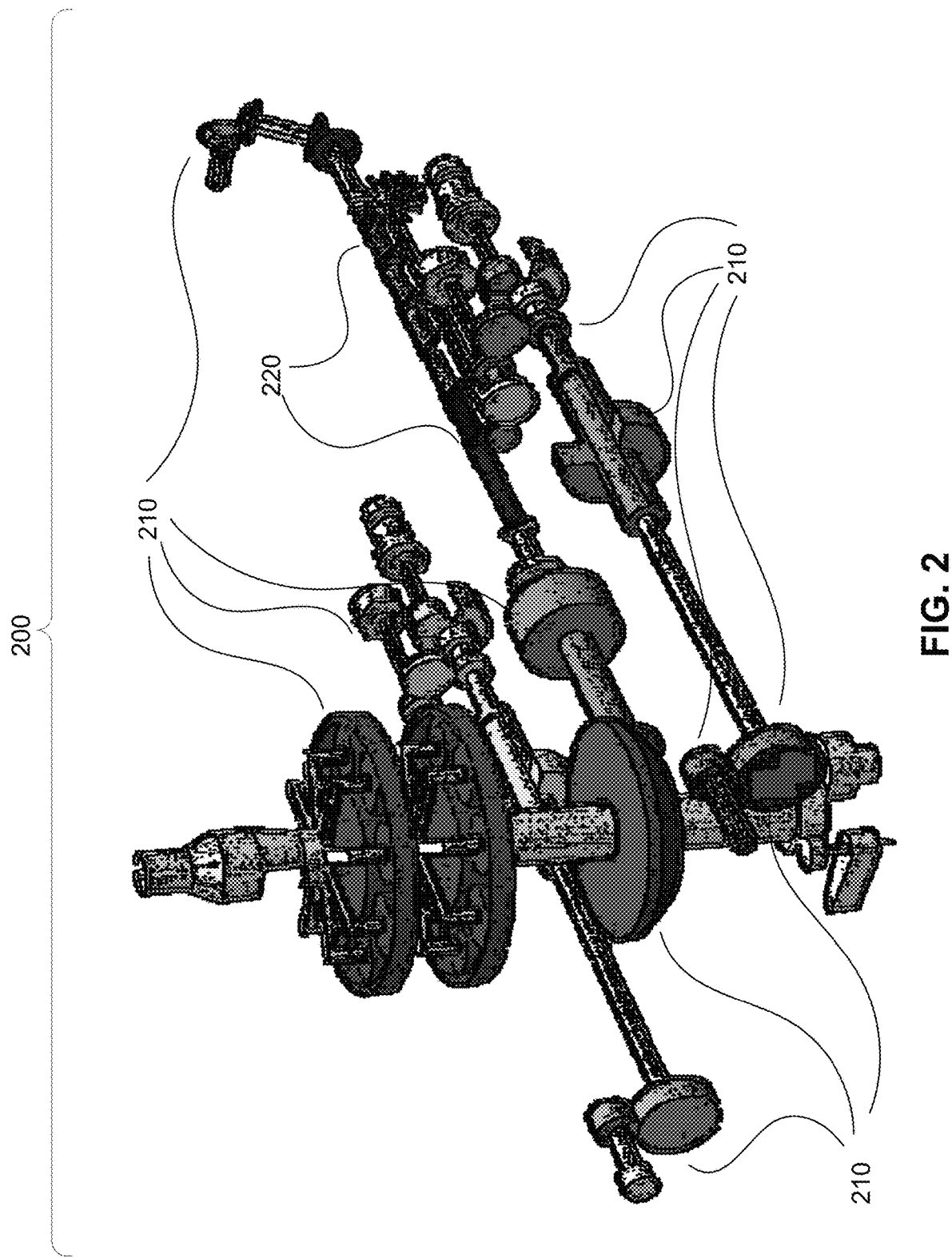
FIG. 2 illustrates an exemplary helicopter drive train with exemplary placements of vibration sensors.

FIG. 2 illustrates an exemplary, complex internal mechanical element 200 of the vehicle 100, in this case an exemplary helicopter drive train 200 or gear system 200. The gear system 200 is internal to helicopter 100 (and so not shown in the view of FIG. 1), and includes gears, drive shafts and other elements which may be used to transfer power from the helicopter engine (not shown) to the helicopters rotors (not shown) and other elements within the helicopter, such as generators. Gears are typically enclosed within gear boxes 210. Drive shafts may also have shaft enclosures 220. The vibration sensors 110 associated with the drive drain 200 are generally located internally to the gear boxes 210 and shaft enclosures 220, and so are not directly visible in FIG. 2; but the vibration sensors 110 are thereby suitably situated to detect vibrations at numerous points along the drive train 200.

As will be understood by persons skilled in the relevant arts, similar placements of vibration sensors 110 may be made at multiple points among and along numerous elements of the vehicle 100 (for example, along or within the engine, not illustrated in the figures). The result is a wealth of vibration data from and throughout critical points in the vehicle 100, along with a large volume of raw data 510 (see FIG. 5) from vibration sensors 110.

The detailed operations of vibration sensors 110 are beyond this scope of this document and will not be presented here. In general, vibration sensors 110 detect accelerations of mechanical elements, and in some embodiments may be understood as being accelerometers, or an accelerometer may function in whole or in part as a vibration sensor 110. In other embodiments a vibration sensor 110 may be an element distinct from an accelerometer. A vibration sensor 110 may output raw vibration data 510 in analogue form, as a current or voltage waveform which is directly output from the sensor 110 and conforms with sensed vibrations, indicating vibration frequency, vibration intensity, or both. In other embodiments a vibration sensor 110 may generate suitable analogue waveform(s) internally, and then output a digital representation, for example a time series of magnitudes.

FIG. 3 illustrates, in list form and tabular form, information which is indicative of exemplary types and volume of vibration data which may be collected by vibration sensors 110 on board an exemplary helicopter 100. Table 305 lists operational parameters for exemplary vibration sensors 110 (listed in the figure as "Accelerometers") which may be found on board on exemplary helicopter 100. It may be seen that some fifteen vibration sensors 110 are distributed throughout and collect vibration data at multiple locations within the helicopter 100, with spare sensors available for potential use.

List 310 lists exemplary ranges of likely or potential operational configurations for vibration sensors 110 for some exemplary embodiments of the present system and method. An exemplary helicopter 100 may for example employ anywhere from twenty-four to forty-three vibration sensors 110 distributed around the transmission system, cabin, engines, and other vehicle locations and parts. Each vibration sensor 110 may detect vibrations in the frequency ranges indicated, with acquisition times in the indicated ranges with vibration levels as low as 0.001 g's up to about 300 g's. Other operational parameters for the vibration sensors 110 may be envisioned as well within the scope and spirit of the present system and method.

It will be apparent to persons skilled in the art that the volume of data, in total bytes, which may be collected over hours of transport time and by dozens of vibration sensors 110 (as part of the much larger collection of vehicle sensors 105), will be of such a large volume as to make impractical the storage and transmission of all the raw data 510 for a flight or trip of the vehicle 100. For this reason, present systems enable long-term storage of sensor data for a full duration of a flight only for condensed and/or selected and/or processed sensor data.

Vehicle Health and Usage Monitoring System (HUMS)

In some embodiments, the present system and method may be implemented in the context of a vehicle sensing/monitoring system 400, also known as a health and usage monitoring system (hereinafter, "HUMS") 400 for a vehicle 100 such as a helicopter 100. The terms "monitoring system", "health and monitoring system", and "HUMS" are used interchangeably and with the same meaning below in this document.

Figure 4:
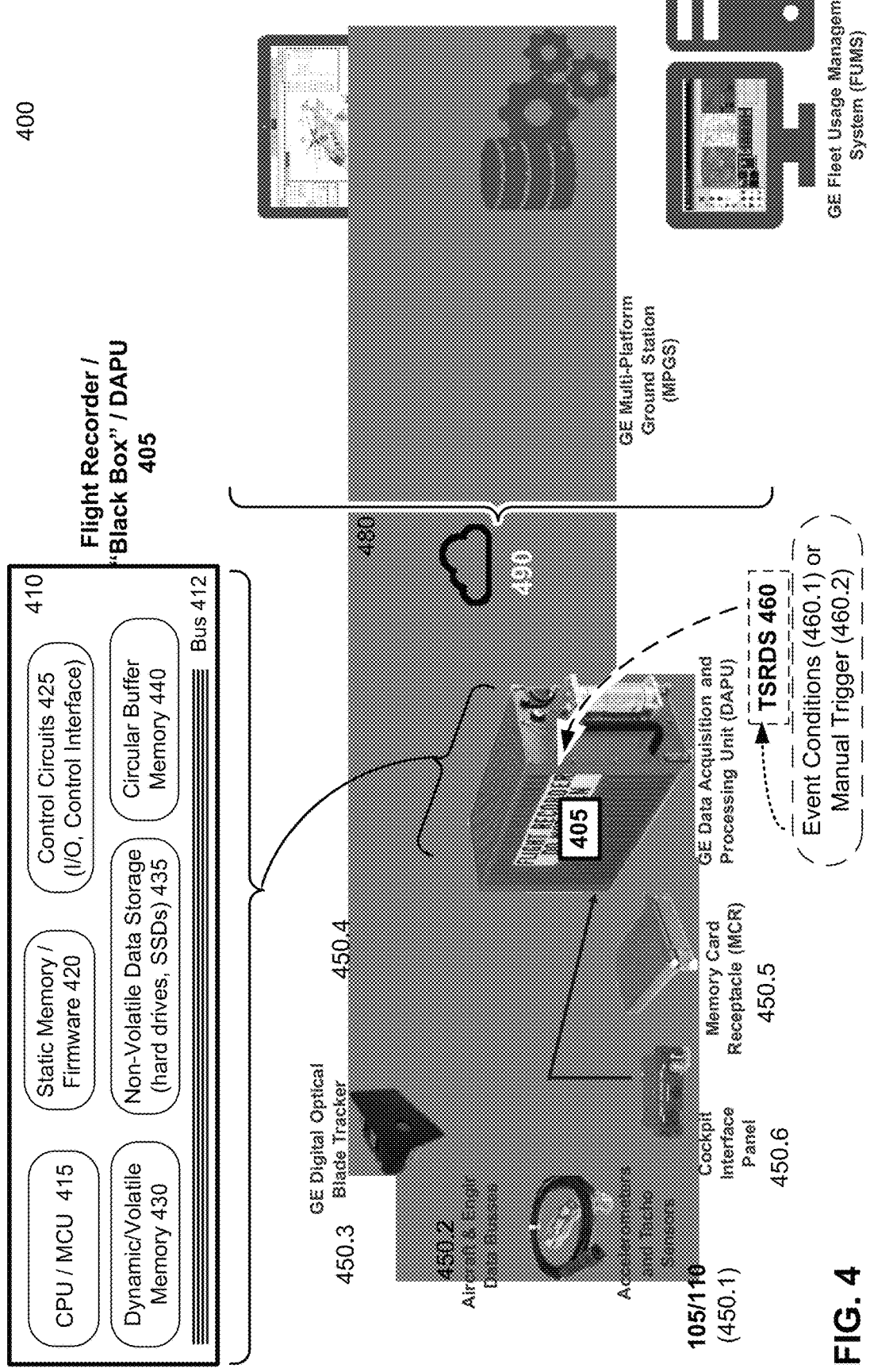
FIG. 4 illustrates an exemplary vehicular health and usage monitoring system (HUMS) which may be associated with a transport vehicle such as a helicopter.

FIG. 4 illustrates an exemplary HUMS 400 which may be associated with a transport vehicle 100 such as a helicopter 100. The HUMS 400 may include, for example and without limitation:

(1) One or more flight recorders 405, which also may be known as a Data Acquisition and Processing Unit (DAPU) 405, which functions as the real-time processing and data storage core of the HUMS 400, and which is conventionally referred to as the flight recorder 405;

(2) One or more Vehicular Distributed HUMS Elements 450, which may include a variety of sensors 105/110 distributed throughout the vehicle 100, as well as other elements; and (3) One or more Off-Vehicle Analysis or Response Units 480, which may operate either in real-time (receiving real-time flight/transit data from the vehicle 100), or which may be used after-the-fact for post-flight/post-operations/post-event analysis of the performance of vehicle 100.

Exemplary Elements of an Exemplary Data Acquisition and Processing Unit (DAPU)

As illustrated schematically in the callout in FIG. 4, and in one exemplary embodiment, the DAPU 405 may include a motherboard 410 which typically holds and interconnects various microchips 415/420/425, and volatile and non-volatile memory or storage 430/435/440, which together enable at the hardware level the operations of the DAPU 405 and also enable the operations of the present system and method. Motherboard 405 may include, for example and without limitation:

A hardware processor 415, also known as a central processing unit (CPU) 415 or microcontroller unit (MCU) 415, provides for overall operational control of the DAPU 405. This includes but is not limited to receiving data from sensors 105/110, and possibly modifying some operations of sensors 105/110 via various application specific integrated circuits (ASICs) 425.

Static memory or firmware 420 may store non-volatile operational code, including but not limited to operating system code, computer code for locally processing and analyzing data from sensors 105/110, and computer code which may be used specifically to enable the DAPU 405 to implement the methods described in this document and other methods within the scope and spirit of the appended claims. CPU 415 may employ the code stored in the static memory 420 to implement the methods described in this document and other methods within the scope and spirit of the appended claims.

Control circuits 425 may perform a variety of tasks, including data and control exchanges with sensors 105/110, as well as input/output (I/O) tasks, network connection operations, control of the bus 412, and other tasks generally known in the art of processing systems. Control circuits 425 may also control or interface with non-volatile data storage 435 and/or circular memory buffers 440.

Control circuits 425 may also support such functions as external input/output (for example, via USB ports, an Ethernet port, or wireless communications, not illustrated in the figure); a control interface for a cockpit interface panel 450 and/or a cockpit control unit (CCU); addressing and receiving data from various aircraft and engine data buses 450; and storing data in memory card receptacle (MCR) 450.

Volatile memory 430, such as dynamic RAM (DRAM), may be used to temporarily store data received from the sensors 105/110; exemplary sensor data content is described elsewhere in this document. Volatile memory 430 may also be used to temporarily store some or all of the code from static memory 420, and also for temporarily storing processed sensor data which is generated by hardware processor 415 based on the data received from sensors 105/110.

Activation and control of sensors 105/110 (for such sensors 105 as may require dynamic operational fine-tuning) may in some embodiments be maintained directly by CPU 415. In other instances, activation and control may be effectuated by CPU 415 via various application specific integrated circuits (ASICs) 425 which act as intermediary control circuits.

Figure 5:
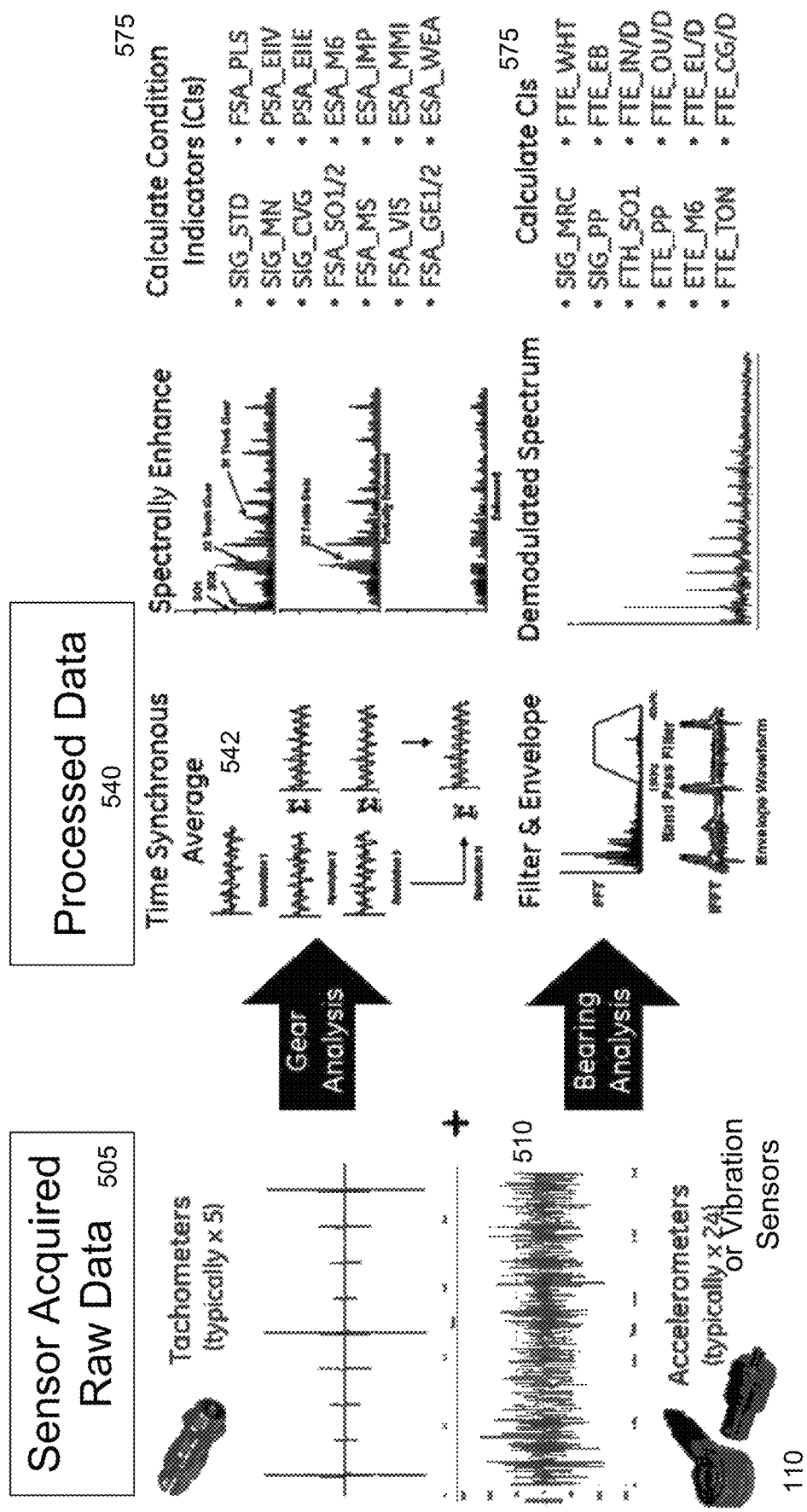
FIG. 5 illustrates exemplary processing of exemplary raw vibration and tachometer data to generate exemplary processed data by an exemplary vehicular health and usage monitoring system (HUMS).

Non-volatile data storage 435 provides long-term storage for sensor data, which may include some raw sensor data 505 (see FIG. 5) recorded over time; but typically includes processed (and thereby condensed) sensor data 540 (see FIG. 5). Non-volatile storage may take the form of hard disk drives, solid state drives (including flash drives and memory cards), recording on magnetized tape, storage on DVD or similar optical disks, or other forms of non-volatile storage now known or to be developed. For reasons discussed elsewhere in this document, non-volatile storage 435 is typically not used to store all of the raw sensor data 505 collected from sensors 105 during the transit of the vehicle 100.

Circular buffer memory 440 is a form of volatile, short-term data storage which may be employed by the present system and method to store limited amounts of raw sensor data 505. In an embodiment, the circular buffer memory 440 may actually be a designated section or address area(s) of volatile memory 430 discussed above. In an alternative embodiment, the circular buffer memory 440 may be implemented via one or more high speed cache memory-buffers integrated into CPU 415. In an alternative embodiment, the circular memory buffer 440 may be implemented as a separate, dedicated memory chip 440.

Buffer storage time duration: The circular memory buffer 440 is typically configured to store selected raw sensor data 505 for up to a maximum of some designated time interval 930 (see FIG. 9 below), that time interval typically being much briefer than the length of a typical flight or trip by vehicle 100. For example, the circular memory buffer 440 may be configured with an expectation of storing one minute of raw sensor data 505, or two minutes of raw sensor data 505, or five minutes or ten minutes. Other times, including longer times, may be envisioned as well. The circular memory buffer 440 is therefore configured to maintain a temporary, dynamic storage of a recent raw vibration data for a designated duration of time 930 (see again FIG. 9) prior to and including the current real-time.

In one embodiment of the present system and method, the designated duration of time 930 for temporary, dynamic retention of raw vibration data 510 in the circular memory buffer 440 is determined or assigned as an amount of time which is anticipated to be at least sufficient to span several minutes of flight time prior to any physical vibration event 780 (see FIG. 7, below), plus the time it is expected for a person (such as a pilot) to be aware of, and to generate a trigger signal for raw-data storage (TSRDS) 460 (see FIG. 4 below) for the physical vibration event 780.

In an alternative embodiment of the present system and method, the designated duration of time 930 for temporary, dynamic retention of raw vibration data in the circular memory buffer 440 is determined or assigned as an amount of time which is anticipated to be at least sufficient to span: (i) several minutes of flight time prior to any physical vibration event 780, plus (ii) the time it is expected for a the flight recorder 405 to identify a physical vibration event 780, based on sensor data, and thereby to automatically generate a trigger signal for raw-data storage (TSRDS) 460.

Data from multiple sensors: Typically, the circular memory buffer 440 is configured to store the raw data 510 from multiple sensors 105, such as raw vibration data 510 from multiple vibration sensors 110. The circular memory buffer 440 may be configured, or may be controlled by CPU 415 or one or more control circuits 425, to ensure that the circular memory buffer 440 is continually updated with the most recent, instantaneous sensor data, in the process overwriting the oldest sensor data in the buffer.

Internal DAPU sensors: While not illustrated in FIG. 4, the DAPU 405 may also contain its own internal sensors, including for example and without limitation one or more vibration sensors 110, location sensors, gross acceleration sensors, heat sensors, internal electrical system (for example, motherboard) status sensors, memory/storage condition sensors, and other sensors as well.

Removable memory or storage: Above it is indicated that the DAPU 405 contains internal volatile memory 430, non-volatile data storage 435, and circular buffer memory 440. In some embodiments, a DAPU may have or be connected to/coupled with one or more memory receptacles or storage receptacles (MCRs) 450.5 configured to contain the memory 430/440 or storage 435, or in some embodiments to contain supplementary, backup, or additional memory 430/440 or storage 435, which can be inserted and removed via an exterior access port of the MCR 450.5.

A system bus 412 may serve to transfer data and messages between elements of motherboard 410, and between motherboard 410 and various other sensors, microchips, and controllers of DAPU 405.

Ports and connectors: Not shown in FIG. 4, but present somewhere on the surface of the DAPU 405, may be ports and connectors, such as USB ports, Ethernet ports, and various specialized connectors and ports for connecting distributed HUMS elements 450 to the DAPU 405. In FIG. 4, and for the exemplary DAPU 405 illustrated, such ports and connectors may be embedded within or integrated into a surface of the DAPU 405 which is hidden from view as the flight recorder 405 is oriented in the figure.

In some embodiments of the present system and method, some Vehicular Distributed HUMS elements 450 may communicate with the DAPU 405 via wireless communications, for example on-board WiFi or Bluetooth connections, or other wireless connections. The DAPU 405 may have antennas and/or internal wireless circuitry (not shown in the figure) to enable such wireless data communications.

Vehicular Distributed HUMS Elements: FIG. 4 illustrates a variety of exemplary HUMS elements 450 which are typically part of or integrated into the vehicle 100, and which are connected to the flight recorder/DAPU 405 via wires, cables, optical fibers, or possibly wireless means. These may include, for example and without limitation, one or more sensors 450.1/110/105; aircraft and engine data buses 450.2 to deliver data to and transmit analyzed sensor data results from the DAPU 405; one or more blade trackers (or, for example, aircraft wing operations sensors) 450.3; a cockpit control unit 450.4, and a cockpit interface panel 450.6.

The details of these and other possible vehicular distributed HUMS elements 450 are beyond the scope of this document, and are not presented here.

Off-Vehicle Processing Systems: The HUMS system 400 may include one or more off-vehicle analysis or response units (OVARU) 480. These may communicate with the DAPU 405 via wireless connections, or via wired data connections or cloud data connections once the vehicle 100 is post-transit (for example, on the ground and in a hangar). Several exemplary off-vehicle processing systems 480 are illustrated in FIG. 4, but many others may be envisioned as well. Such OVARUs 400 may operate either in real-time (receiving real-time flight/transit data) from the vehicle 100, or which may be used after-the-fact for post-flight/post-operations/post-even analysis of the performance of vehicle 100.

The details of such OVARUs 480 are beyond the scope of this document, but it will be noted that in typical embodiments, and OVARU 480 may:

(i) be used after-the-fact for post-flight/post-operations/post-event analysis of the performance of the vehicle 100; or be used in real-time (receiving real-time flight/transit data) to support flight operations or large-scale fleet operations;

(ii) be implemented as software on a general-purpose computer, though specialized computers may be employed; and (iii) are supported in their analysis by the sensor data obtained from the vehicle via the one or more flight recorders 405.

Particularly for the analysis of crashes, accidents, and other flight incidents: An OVARU 480, and the human analysts which the OVARUA may support in their flight/incident analysis work, may benefit from the availability of detailed, real-time flight vibration data, as may be enabled and made available, post-incident, according to the present system and method as described herein and as is within the scope of the appended claims.

Routine Data Monitoring, Flight Events (Incidents), and Trigger Signal: In the course of monitoring a trip or flight, a HUMS 400, and in particular the vehicle sensors 410 and the DAPU 405 will engage in a great deal of routine, sustained data collection and analysis, the scope of which is beyond this document. However, and as discussed further elsewhere in this document, the DAPU 405, in combination with other elements of the HUMS 400, may be configured or programmed so that a trigger signal for raw-data storage (TSRDS) 460 may trigger any or all of additional data collection, more extended data storage or retention, or additional forms of data analysis. In turn, the trigger signal for raw-data storage (TSRDS) 460 may result from either of automatic detection of certain unusual flight or travel events 460.1 (also referred to as event conditions 460.1); or from a manual trigger action 460.2 by a pilot, typically based on a pilot's determination of a flight event or incident.

One potential trigger action 460.2 by a pilot (or other aircraft technician or staff) is simply a pilot's decision to press an Event Button (not illustrated in the figures) on a cockpit control unit 450.4 or elsewhere in the vehicle 100. Automated event conditions 460.1 may be initiated by sensors programmed to generate the TSRDS 460 when certain environmental thresholds are exceeded (for example, excess gross acceleration or reduced cabin pressures); and other automated event conditions 460.1 may be generated internally by DAPU 405 based on an analysis of data from or more sensors 105.

The trigger signal for raw-data storage (TSRDS) 460 may be referred to equivalently in this document, including in the appended claims, as a "processing trigger condition" (PTC) 460 or simply as a "trigger condition" (TC) 460. As above, a processing trigger condition 460 may be asserted automatically via hardware and software, or may be initiated by pilot or other human operator action. The term TSRDS is employed throughout most of this document.

Data Reduction for Long-Term, Non-Volatile Data Storage

FIG. 5 illustrates exemplary processing of exemplary raw vibration and tachometer data to exemplary processed data by an exemplary vehicular health and usage monitoring system (HUMS).

In a DAPU 405, the hardware processor 415 typically receives raw sensor data 505 and then provides significant numerical processing or calculations to generate processed sensor data 540. Processed data 540 may include, for example and without limitation: average values of sensor data collected over defined time periods (for example, tenths of a second, a second, five seconds or ten seconds, or other intervals), and similarly mean data values, maximum data values, minimum data values, statistical summaries of data values over defined short time intervals, along with associated specific times when the condensed, processed data 540 was collected (that is, the specific times during a flight or trip).

With reference to FIG. 5, raw signal 510 is sensed by the vibration sensors 110 or accelerometers 110. Tachometers 107 are used to sense rotation speed. The first step in the analysis of raw signal data 510 is to produce a signal average 542 over a number of rotations of the component (in some embodiments, 128 revs, but the average 542 may be over other numbers of rotations). The rotational speed and hence the number of rotations is derived from the signal from the tachometer 107.

Averaging produces a processed signal 542 that is less noisy and from which it is easier to significant extract features: high amplitude vibrations at a particular point in the rotation will not be eliminated from the signal average, but random noise will be eliminated. The signal average 540 is then used to calculate the condition indications 575. Signal averaging has benefits for routine calculation of condition indications 575, which are looking for specific characteristics of the sensed sensor signals, but the raw sensors signals 510 contain all the sensed vibration data.

Limitations of processed signal data and conventional systems: Vibration engineers are often interested in features in the raw signal 510 that are eliminated by signal averaging. For example, if a pilot reported a loud bang, this would show up in the raw signal 510 as a large but brief amplitude increase, but may be masked by the signal averaging. Raw signal data 510 enables the analysis of flight events for various conditions and events which the condition indications 575 are not generally configured or defined to identify.

A further limitation of processed signal data 575 is that the raw data 510 for calculating condition indications 575 is only collected in steady state regimes. The HUMS 400 uses the flight data to determine that the aircraft is, say, flying straight and level at 100 Kts and performs the analyses that are assigned to this regime. This ensures that the condition indications 575 are comparable from one flight to another.

Flight Incidents (Flight Events) and Snapshots: Conventionally, snapshots (or time limited samples) of raw vibration data 510 may be captured whenever a pilot's Event Button is pressed (for example, a designated button on the Cockpit Control Unit 450.4). Using the "loud bang" example as just one of many exemplary possibly flight events or flight incidents: Upon hearing the "bang" the pilot would press the Event Button; the flight recorders 405 in particular and the HUMS 400 generally would sense when the Event Button has been pressed. Legacy HUMS systems 400 (lacking a circular vibration data buffer 440) would then initiate a capture of raw vibration data 510 to be stored in non-volatile storage 435. But during the time leading up to and including the "loud bang", raw vibration data 510 would not be captured and so not saved in storage 435. The vibration engineers then only have available, for analysis, the raw vibration data 510 starting some seconds after the "loud bang."

Present system and method: The present system and method employs a circular buffer memory 440 to continually capture the most recent raw vibration data for temporary storage; and upon receiving the TSRDS signal 460 when triggered manually (460.2) from a pilot pressing the Event Button, or when automatically triggered by other defined event conditions 460.1, the flight recorder moves the contents of the buffer memory 440 to permanent storage 435.

As long as the flight event/incident (such as a "bang") occurred within the recording time period of the buffer (in one exemplary embodiment, two minutes of raw vibration data, but other time durations may be envisioned), raw vibration data 510 leading up to the "bang" event, and immediately following the event (but before the pilot pressed the Event Button, would be saved to permanent storage 435. Assuming the pilot is reasonably quick to press the Event Button—or other manual raw-data-capture triggers 460.2 or automated triggers 460.1 occur shortly after an actual physical 780 event—substantial raw vibration data 510 is saved for both before, during, and after the TSRDS signal 460 is generated.

In embodiments of the present system and method, there may be alternative or multiple different event conditions

460.1 or manual triggers 460.2 which may generate and send a TSRDS signal 460 to the flight recorder 405 to transfer raw, pre-event vibration data 510 and during-event-raw vibration data 510 from buffer memory 440 to non-volatile storage 435. A pilot's Event Button is only one possible exemplary trigger. For example, the HUMS 400 could sense and identify many different exemplary states, such as for example a vertical acceleration exceeding 5 g and then generate a TSRDS 460 to initiate a raw vibration capture from buffer 440 to storage 435.

The present system and method further takes advantage of the fact that there are multiple accelerometers/vibration sensors 110 across the aircraft. Condition indicators 575 are generally calculated (in both prior systems and the present system and method) for specific components, and the condition indicator 575 for any one, specific component will typically employ data from one accelerometer/vibration sensor 110 or a few vibration sensors 110 which are structurally close to that specific component.

In an embodiment, the present system and method may employ multiple circular data buffers 440, with one circular data buffer 440 allocated for obtaining raw vibration data 510 for each accelerometer/vibration sensor 110. In an embodiment, the multiple data buffers 440 are synchronized in time. Referring again to the exemplary "loud bang" example, presented above: the vibration engineers analyzing the event will know (from design specifications for vehicle 100) the location in vehicle 100 of each accelerometer/vibration sensor 110.

Employing the captured, time-synchronized raw vibration data 510 at known locations from before, during, and after an event, vibration engineers can both (i) see the vibration characteristics of the "bang" event at certain known points, and also (ii) track the progression of vibrations through each sensing location in the vehicle 100. This potentially aids in determining the source point of the "loud bang" (or other events) along or within vehicle 100.

Summary: Capturing and saving to permanent storage 435 the raw vibration data 510 from vibration sensors 110 throughout vehicle 100, from before, during, and after a trigger signal for raw-data storage (TSRDS):

(1) enables vibration engineers to assess features in the vibration signal that are not assessed by condition indicators. These features can be, but do not have to be, short term;

(2) the raw vibration data 110 from before, during, and after an event may be captured whenever a trigger signal for raw-data storage (TSRDS) 460 is generated, including but not limited to when the pilot presses the Event Button and other automatic, programmed event condition (460.1) responses;

(3) supports the ability to capture time-synchronized raw vibration data 510 from all accelerometers 110 at once.

The circular memory buffer(s) 440 enables items (1) and (3) immediately above to be assessed from before the physical condition 780 is actually even sensed.

In alternative embodiments of the present system and method, processed sensor data 540 may be generated by CPU 415 by retaining, for long-term storage, only a subset of received raw sensor data 505. For example, out of every 1000 time sequential data values received from a vibration sensor 110, the CPU 415 may be programmed via suitable control programs to store, in long term storage, only one-in-one-thousand data samples, or five-in-one-thousand, or one-hundred-of-one-thousand data samples. These selection ratios are strictly exemplary, and others may be employed as well to ensure suitable reduction and management of long-term sensor data storage.

As is known in the art for image processing, various advanced compression algorithms may be employed by a hardware processor to transform raw image bitmap data from a camera 105 into compressed formats such as jpg or png. Similar compression algorithms may be employed for other forms of data, such as vibration data from vibration sensors 110.

The processing and condensing of raw sensor data 505 by CPU 415 means that large amounts of summary sensor data can be collected and then maintained in long-term, non-volatile storage 435 while using relatively manageable amounts of long-term storage 435.

At the same time, there may occur during a flight or transit one or more flight events (equivalently, "flight incidents"), typically signaled automatically by event conditions 460.1 or by pilot manual trigger 460.2, when it may be advantageous to retain, for long-term storage, selected raw sensor data 505, for designated time intervals from before, during, and after a trigger signal for raw-data storage (TSRDS). It is an objective of the present system and method to advantageously stored selected raw data 510 from vibration sensors 110, as discussed throughout this document.

Flight events or flight conditions may be defined by system design engineers or may be identified in real-time by a pilot or other human operator, and may include for example without limitation: unexpected or extreme aircraft motions, unexpected or extreme changes of aircraft orientation, undesirable mechanical events on-board or nearby the aircraft, unexpected in-flight sounds, or unexpected aircraft component failures. Other flight events or flight conditions may be envisioned as well.

Table 1, immediately below, compares some aspects, such as required storage, for raw vibration data 510 versus processed vibration data 540.

TABLE 1

| | Comparison of Raw Vibration Data and Processed Vibration Data | | | | |
|---|---|---|---|---|---|
| | Sampling Interval Per Sample | Samples Recorded Per Second | Stored as analog signal or digital values? | Typical Components from Which Data is Obtained | Required Storage (Kbytes or Mbytes) per minute of data |
| Raw Vibration data | Up to 256 kHz | 256 kHz | Stored as digital data in temporary memory unless moved to permanent storage | Gears, Bearings, Transmission shafts, Rotors, Engine Parts, Airframe Vibration. | ~30 Mbytes/minute/sensor As system with 24 sensors would store703 Mb/minute |

TABLE 1-continued

Comparison of Raw Vibration Data and Processed Vibration Data

| | Sampling Interval Per Sample | Samples Recorded Per Second | Stored as analog signal or digital values? | Typical Components from Which Data is Obtained | Required Storage (Kbytes or Mbytes) per minute of data |
|---|---|---|---|---|---|
| Signal Averages (processed data) | The signal is stored at up to 100 kHz. One signal per N revs of component of interest. N is usually 128, when a steady state regime is detected. | | Digital data in long term storage | Gears, Bearings, Transmission shafts, Rotors, Engine Parts, Airframe Vibration. | As above, but much less data is stored as it is averaged over 128 revs and at 100 kHz range |
| Condition indications 575 (CIs) (processed data) | There are usually 10-12 CIs calculated per component. One value (1-2 bytes) stored of each CI stored per signal average | | Digital data in long term storage | Gears, Bearings, Transmission shafts, Rotors, Engine Parts | A few Mb per flight |

Legacy Capture and Storage of Raw Vibration Sensor Data

Figure 6:
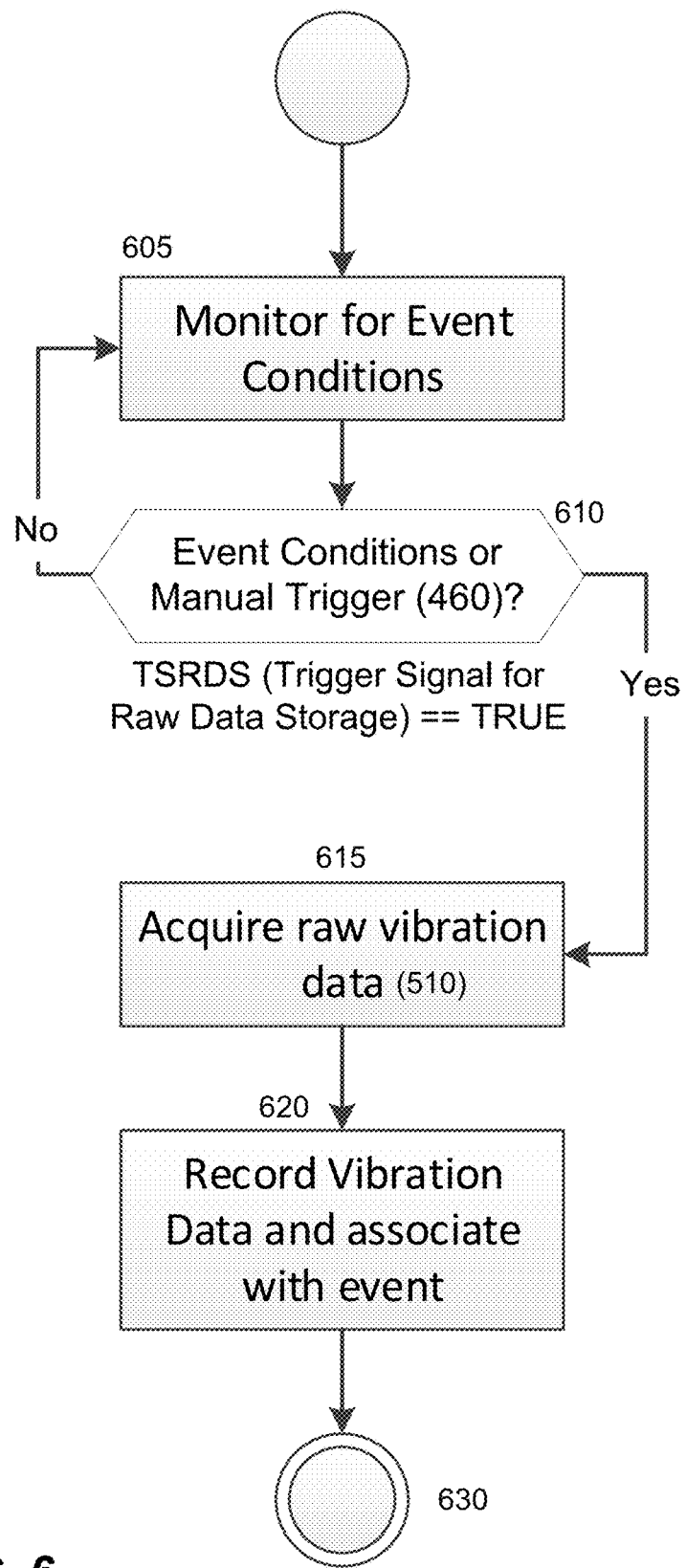
FIG. 6 presents a flow chart of an exemplary method of storage of raw sensor data by a vehicular health and usage monitoring system according to known systems and methods.

FIG. 6 presents a flow chart of an exemplary method 600 of storage of raw sensor vibration data 510 by an exemplary vehicular health and usage monitoring system 400 according to known systems and methods.

The method 600 begins with step 605. In step 605, a vehicle health and usage monitoring system 400 or HUMS 400, and more particularly the flight recorder or DAPU 405, continually monitors a vehicle 100 for a trigger signal for raw-data storage (TSRDS) 460. An exemplary cause for a TSRDS 460 is the pilot's selection of the Event Button on the vehicle's cabin (manual trigger 460.2), but defined flight events or flight incidents may generate automated event conditions 460.1 which initiate method 600.

In step 610, the method 600 determines if an TSRDS 460 has been generated. If no TSRDS 460 has been generated, the monitoring 605 simply continues. If a TSRDS 460 is detected, step 610 continues with step 615.

Step 615 entails initiating the acquisition (for example, in dynamic memory 430) of raw vibration data 510 from vibrations sensors 110.

The method 600 continues with step 620. In step 620, the raw vibration data 510 is stored to non-volatile data storage 435, and the vibration data 510 is associated with a specific event indicator data or tag (not illustrated). The event indicator tag may include storage of an event ID number, the time of the event, the nature of or data in the TSRDS 460, and source of the TSRDS 460 (such as the Event Button or identification of a sensor 105 which generated the TSRDS 460, or other hardware or software source).

In an alternative embodiment, elements of steps 615 and 620 may be combined, in that the acquired raw vibration data 510 with event association may be stored directly to non-volatile data storage 435.

The method 600 ends at step 630, which in an embodiment may entail terminating the collection of raw vibration data 510 after a designated time interval, such as two minutes, five minutes, or longer or shorter intervals.

It will be noted, however, that typically the entire method 600 remains in operation throughout a trip, in that monitoring for event conditions 605 may be maintained for the duration of flight or travel of vehicle 100.

Figure 7:
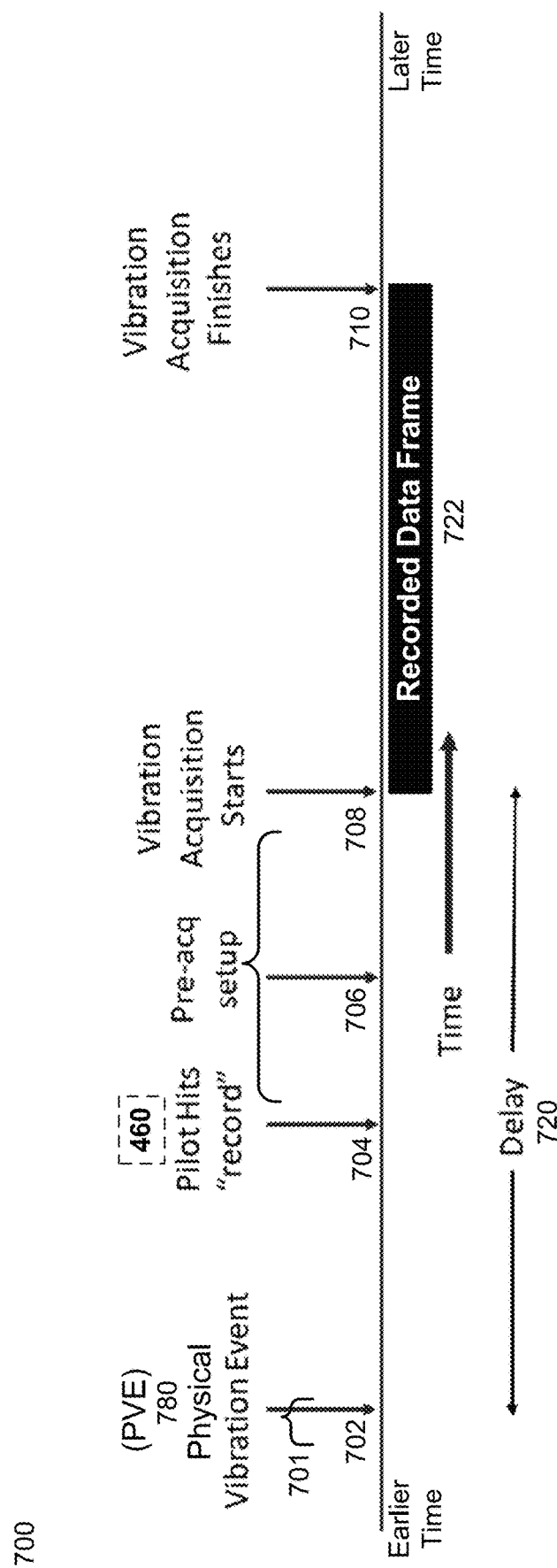
FIG. 7 illustrates an exemplary timeline of acquisition of raw vibration data into non-volatile data storage, as the data may be collected according to known systems and methods.

FIG. 7 is related to the method 600 of FIG. 6. FIG. 7 illustrates an exemplary timeline 700 of acquisition of raw vibration data 510 into non-volatile data storage 435, as the data may be collected according to legacy method 600 above. As may seen in FIG. 7, an unexpected flight event 780—illustrated in the figure as a "physical vibration event" 780 or PVE 780, but the event 780 may be a bump or unexpected noise or some other unexpected event—occurs at a first time 702. Persons skilled in the relevant arts will appreciated that a physical vibration event 780 may occur over some sustained duration of time 701; for convenience of exposition herein, and without being limiting, a single PVE event time 702 is used for discussion in this document, the event time 702 being a time within the time range of duration 701.

At a later time 704, and in response to the physical vibration event 780, a system-level trigger signal for raw-data storage (TSRDS) 460 is generated, for example by manual triggering 460.2 (a pilot pressing an Event Button or Record Button) or by an event condition 460.1.

In some embodiments of the present system and method, the TSRDS 460 may be generated automatically by one or more sensors 105 or by flight recorder 405 itself. Even in such embodiments, some amount of time generally elapses between the physical vibration event 780 at time 702 and the TSRDS 460 at time 704.

Following the TSRDS signal 460 at time 704, some software and/or hardware setup, referred to in the figure as "Pre-acquisition setup", may be required to initiate the acquisition of raw sensor data 510. Such pre-acquisition setup may continue for some time, for example an interval centered around time 706, which is subsequent to time 704.

The actual acquisition and storage in long-term storage 435 then commences at a time 708 which is later than time 706. From time 708 through time 710, raw vibration data 510 is then recorded in long-term storage 435 in a recorded data frame 722, along with a suitable event indicator tag. The raw vibration data 510 is stored with suitable timeline data or indicators. Recording of raw vibration data 510 concludes at time 710, typically upon the completion of some specified time interval (such as two minutes, five minutes, or other configurable time intervals).

As may be seen from the timeline, there is no raw vibration data 510 collected or stored for the time prior to the vibration event 780 at time 702. Also, no raw vibration data 510 is collected at the time 702 of the physical vibration event 780, nor at times 704 of the TSRDS 460; and also not during the pre-acquisition setup time or interval 706. The result is a cumulative time delay interval 720 between the time 702 of the vibration event 780 and the time 708 when raw vibration data acquisition begins. All such raw vibration data 510 for both the time 702 of the physical event 780 and prior, and raw vibration data 510 for time up to and including the TSRDS 460, is not recorded, and is therefore not available for post-event/post-flight analysis. (For comparison, see FIG. 9 below.)

Exemplary Methods for Capture and Storage of Raw Vibration Sensor Data

Figure 8:
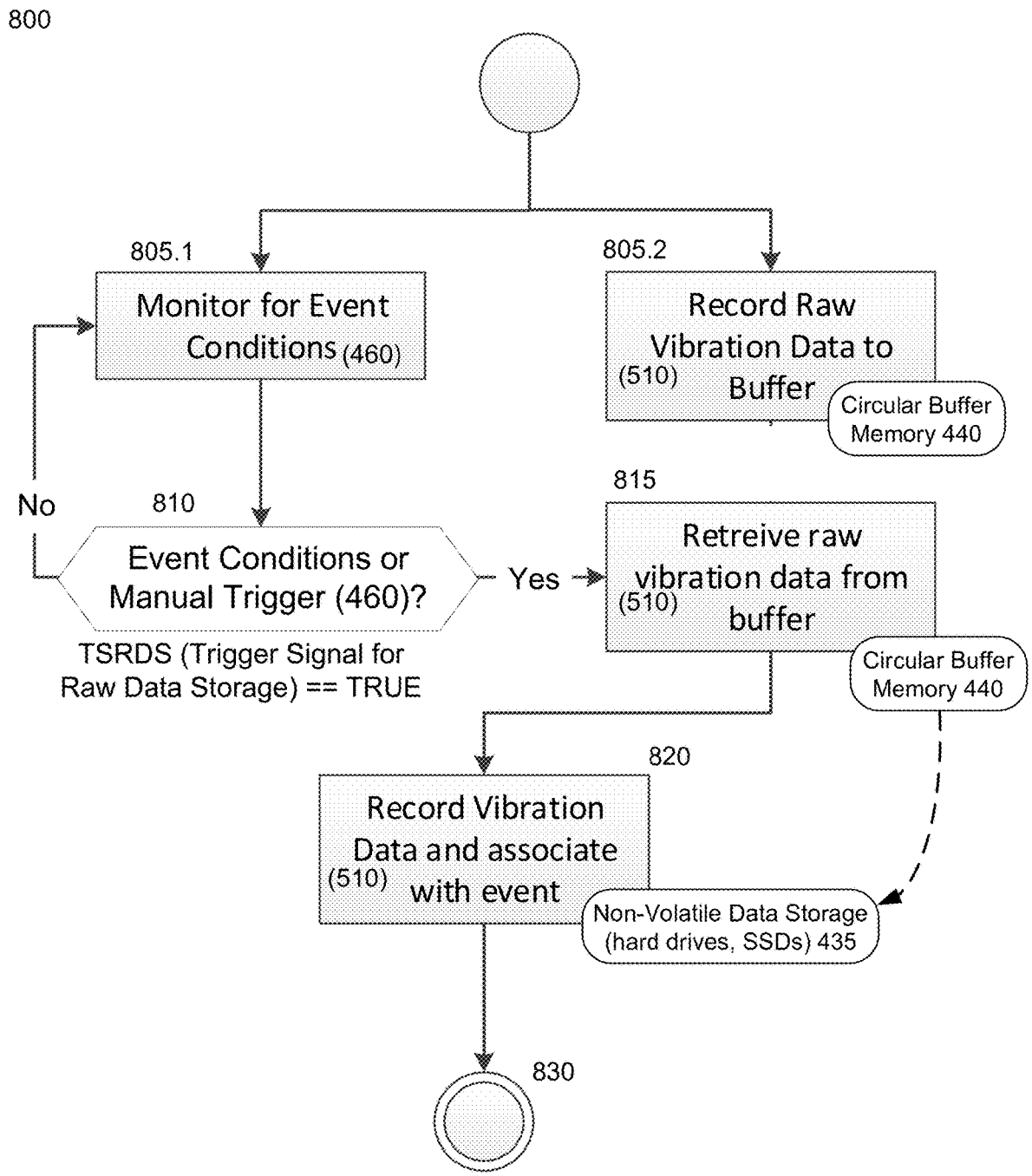
FIG. 8 presents a flow chart of an exemplary method of storage of raw sensor data by an exemplary vehicular health and usage monitoring system according to exemplary embodiments of the present system and method.

FIG. 8 presents a flow chart of an exemplary method 800 of storage of raw sensor data 510 by an exemplary vehicular health and usage monitoring system 400 according to exemplary embodiments of the present system and method.

The method 800 begins with step 805. Step 805 entails two activities 805.1 and 802.2 (which may also be referred to equivalently as two processes 805.1/805.2), which logically operate in parallel with each other, and operationally are concurrent and substantially continuous in time. Put another way, in an embodiment both activities 805.1 and 805.2 occur continuously throughout the entire time the flight recorder/DAPU 405 monitors flight operations (which is typically for the entire duration of vehicular travel).

In activity 805.1, a vehicle health and usage monitoring system 400 or HUMS 400, and more particularly the flight recorder or DAPU 405, continually monitors a vehicle 100 for a trigger signal for raw-data storage (TSRDS) 460. An exemplary cause for a TSRDS 460 is the pilot's selection of the Event Button on the vehicle's cabin (manual trigger 460.2), but automated event conditions 460.1 may also be asserted based on various defined flight incidents/events, as discussed elsewhere in this document.

In activity 805.2, one, several, most, or all of the vibration sensors 110 throughout the vehicle 100 deliver raw vibration data 510 to respective vibration circular memory buffers 440 of DAPU 405. As discussed in detail elsewhere in this document, circular memory buffers 440 may be reserved or partitioned memory in the general dynamic memory 430, or in an alternative embodiment may be implemented in volatile memory chip(s) which is/are separate from the DAPU's general dynamic memory 430.

As discussed in detail elsewhere in this document, the circular memory buffers 440 record and retain raw vibration data 510 from a determined interval of time up-to-and-including a present moment in time. Exemplary storage interval times might be one minute, two minutes, five minutes, fifteen minutes, or other shorter or longer periods of time. In one embodiment of the present system and method all circular memory buffers retain raw vibration data for a same time interval into the past. In an alternative embodiment, different circular memory buffers 440 for different vibration sensors 110 may be configured to retain raw vibration data 510 for differing intervals of time (for example, some for one minute, some for two minutes, some for five minutes, some for ten minutes, some for other intervals spanning from the present moment into the past). As new current raw vibration data 510 is saved to an appropriate circular memory buffer 440, the oldest data in the buffer 440 is overwritten.

In step 810, exemplary method 800 determines if a TSRDS 460 has been generated. If no TSRDS has been generated, then step 805, with its two processes 805.1/805.2 simply continues. If a TSRDS has been generated, stop 810 continues with step 815.

Step 815 entails: (i) retrieving the most recent raw vibration data 440 from the circular memory buffers 440 (as stated on the flow chart of FIG. 8), and so obtaining the most recent data prior to, during, and in the seconds following the event condition 460; and (ii) continuing the acquisition of raw vibration data 510 from the vibrations sensors 110 (omitted from the flow chart of FIG. 8).

The method 800 continues with step 820. In step 820, the raw vibration data 510 currently in the circular memory buffer 440 is transferred to non-volatile data storage 435, and the continuing raw vibration data 510 which is acquired after the event condition is also stored in non-volatile data storage 435. The data is stored with suitable timeline data or indicators. The combined raw vibration data 510 is associated with a specific event indicator data or tag (not illustrated). The event indicator tag may include storage of an event ID number, the time of the event, the nature of or data in the TSRDS 460, and source of the TSRDS 460 (such as the Event Button or identification of a sensor 105 which triggered the event, or other hardware or software source).

The method 600 ends at step 630, which in an embodiment may entail terminating the collection of raw vibration data 510 after a designed time interval, such as two minutes, five minutes, or longer or shorter intervals.

It will be noted, however, that typically the entire method 800 remains in operation throughout a trip.

Figure 9:
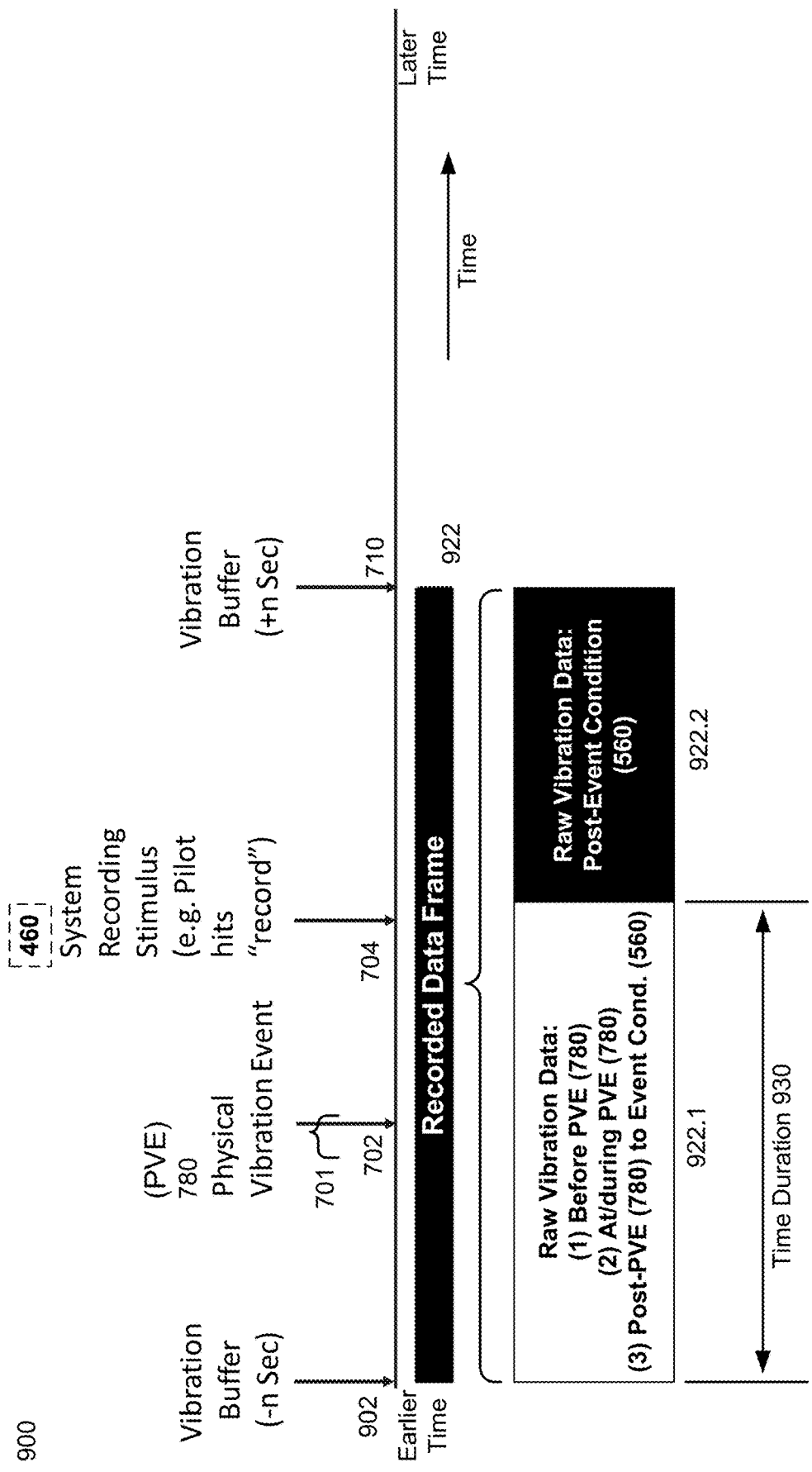
FIG. 9 illustrates an exemplary timeline of acquisition of raw vibration data into non-volatile data storage, as the data may be collected according to exemplary embodiments of the present system and method.

FIG. 9 is related to the exemplary method 800 of FIG. 8 according to the present system and method. FIG. 9 illustrates an exemplary timeline 900 of acquisition of raw vibration data 510 into non-volatile data storage 435, as the data may be collected according to exemplary embodiments of the present system and method.

As may be seen in FIG. 9, an unexpected flight event 780—illustrated in the figure as a "physical vibration event" 780, but the event 780 may be a bump or unexpected noise or some other unexpected event—occurs at a first time 702. At a later time 704, and in response to the physical vibration event 780, a system-level trigger signal for raw-data storage (TSRDS) 460 is generated, for example a manual trigger 460.2 generated by a pilot pressing an Event Button or Record Button.

In some embodiments of the present system and method, the TSRDS 460 may be generated automatically by one or more sensors 105 or by flight recorder 405 itself. Even in such embodiments, some amount of time generally elapses between the vibration event 780 at time 702 and the TSRDS 460 at time 704.

In embodiments of the present system and method according to the exemplary method 800 of FIG. 8 and similar embodiments, acquisition and short-term storage of raw vibration data 510 has already been in-progress for the duration of the flight, data from which has been temporarily saved in the circular memory buffer 440 starting from a first time 902 (which is before the time 702 of the physical vibration event 780) and up-to, including, and possibly slightly beyond the trigger signal for raw-data storage (TSRDS) 460. As a result of the TSRDS 460, this raw vibration data 510 in the circular memory buffer 440 is now stored (that is, stored at or shortly after time 704) in long-term storage 435 in a first frame part 922.1 of a recorded raw vibration data frame 922. The circular memory buffer is configured, as discussed above, to maintain a temporary, dynamic storage of a recent raw vibration data 510 for a designated duration of time 930 prior to and including the current real-time. In an embodiment of the present system and method, the time-duration 930 captured by the data in first frame part 922.1 substantially reflects/equals the same the time-duration into the past as the time duration 930 of raw vibration data 510 which can be saved in the circular memory buffer 440.

The raw vibration data which may continue to be recorded for some specified time duration (which extends in the exemplary timeline from or about from trigger time 704 up to a later time 710) is stored in the long-term storage in a second part 922.2 of the recorded raw vibration data frame 922. In an embodiment, the two frame parts 922.1/922.2 are concatenated and stored in long-term storage 435 as one concatenated or combined data frame 922.

Frame 922 may also include other data which is pertinent for post-event analysis, including an event tag, time-stamp information, and the sensor sources of raw vibration data 510.

According to the present system and method, and as may be seen from the timeline 900, the full recorded data frame 922 saved in long-term storage 435 includes:

(1) Raw vibration data 510 collected from a time 902 prior to the physical vibration event 780.

(2) Raw vibration data 510 collected during the physical vibration event 780 which occurs at time 702 or during a time interval 701 which includes time 702;

(3) raw vibration data 510 extending from the physical vibration event 780 up to and including the time 704 of the trigger signal for raw-data storage (TSRDS) 460; and (4) raw vibration data 510 extending from the time 704 of the trigger signal for raw-data storage (TSRDS) 460 to a final time 710 of saving raw vibration data 510.

The result is a long-term recorded, stored data raw vibration data frame 922 which includes continuous raw vibration data from a time 902 which is well before the physical vibration event 780, to a time 710 which is well after the physical vibration event 780.

It will be noted that, in embodiments of the present system and method—which may employ exemplary method 800 or similar methods (and unlike legacy methods such as method 600)—and since there is continuous collection and short-term buffer memory retention of raw vibration data 510 throughout a flight—there is no pre-acquisition setup time or interval 706 for starting to obtain raw vibration data 510. In embodiments of the present system and method, then, there may be no data gaps or timeline gaps in the recorded data frame 922 of the present system and method.

It will also be noted that in legacy methods such as exemplary method 600, the long-term stored data frame 722 essentially includes only the data of second part 922.2 of stored data frame 922, while the legacy data frame does not include the first part 922.1 of the long-term recorded data frame 922.

The present system and method, by contrast, stores all the raw vibration data 722 recorded by legacy methods (now in data frame part 922.1 according to the present system and method), while storing additional earlier raw vibration data 510 in first part 922.1 of the stored raw vibration data frame 922.

Alternative Embodiments

In an embodiment of the present system and method, circular buffer memory 440 may be implemented as a reserved portion of non-volatile, long-term data storage 435.

In an alternative embodiment, the present system and method may be implemented in whole or part via enhanced vibration sensors 110 with on-board circular-buffer memory, on-board non-volatile data storage 435, and/or possibly suitable CPU/memory logic to detect or initiate trigger signal for raw-data storage (TSRDS)s/event conditions 460 at each enhanced sensor 110. Such enhanced vibration sensors may be configured to send their stored raw vibration data frames 922 to flight recorder 405 or other data processing units for consolidation of raw vibration data frames 922 (and possibly for time-synchronization of raw vibration data frames 922) from multiple enhanced vibration sensors 110.

CONCLUSION

Alternative embodiments, examples, and modifications which would still be encompassed by the disclosure may be made by those skilled in the art, particularly in light of the foregoing teachings. Further, it should be understood that the terminology used to describe the disclosure is intended to be in the nature of words of description rather than of limitation.

Those skilled in the art will also appreciate that various adaptations and modifications of the preferred and alternative embodiments described above can be configured without departing from the scope and spirit of the disclosure. Therefore, it is to be understood that, within the scope of the appended claims, the disclosure may be practiced other than as specifically described herein.

What is claimed is:

1. A sensing system for a transport vehicle comprising:
a hardware processor, a buffer memory, and a non-volatile data storage, wherein the sensing system is configured to:
be integrated into the transport vehicle;
receive, from a first vibration sensor at a first known location within the transport vehicle and a second vibration sensor at a second known location within the transport vehicle, each of which is configured to detect vibrations from a mechanical element of the transport vehicle, a first real-time raw vibration data from the first vibration sensor and a second real-time raw vibration data from the second vibration sensor for the mechanical element, wherein the first and second real-time raw vibration data are time-synchronized;
retain in the buffer memory the first and second real-time synchronized raw vibration data for the mechanical element, wherein the buffer memory is a circular memory buffer which is configured to maintain a dynamic storage of a recent raw vibration data for a designated duration of time prior to and including a current time;
monitor for event conditions, concurrently, comprising both an automated event condition and a manual trigger action;
receive, at the hardware processor, a trigger signal for raw-data storage (TSRDS), the TSRDS being generated at least one of (a) the automated event condition comprising a time of a flight event or after the flight event, or (b) the manual trigger action comprising a time of manual triggering;
upon receiving the TSRDS, transfer the recent raw vibration data from the circular memory buffer to the non-volatile data storage, wherein the non-volatile data storage is configured to retain a storage of raw vibration data for the designated duration of time prior to and including a time of the TSRDS;
store in the non-volatile data storage a received raw vibration data over a second duration of time starting substantially at the time of the TSRDS up to a specific time duration, wherein the sensing system is thereby configured to store in the non-volatile data storage a time-continuous data including substantially all the raw vibration data detected by the first and second vibration sensors over a time interval from a first time before the time of the TSRDS to a second time which is a time after the TSRDS; and track, based on the first and second real-time synchronized raw vibration data, a progression of locations of the associated flight event.

2. The sensing system of claim 1, wherein the system is configured to receive a plurality of real-time raw vibration data signals from a plurality of respective vibration sensors, wherein each of the plurality of respective vibration sensors is allocated a circular data buffer.

3. The sensing system of claim 2, wherein the system is further configured so that upon receiving the TSRDS, the system is configured to retain the plurality of real-time raw vibration data signals in a plurality of respective circular data buffers corresponding to the plurality respective vibration sensors.

4. The sensing system of claim 3, wherein the system is further configured to generate and retain in the non-volatile data storage the plurality of real-time raw vibration data signals from the plurality of respective vibration sensors, each respective raw vibration data signal being a time-continuous data including substantially all the raw vibration data detected by each respective sensor over a time interval spanning from before a time of the TSRDS to a second time which is a time after the TSRDS.

5. The sensing system of claim 1, wherein the system is further configured to generate and retain in the non-volatile data storage an additional data associated with the raw vibration data, wherein the additional data comprises at least one of time stamp data correlated with the raw vibration data and a data indicative of the vibration sensors from which the raw vibration data is received.

6. A method for sensing via a monitoring system integrated into a transport vehicle, the method comprising:
receiving at the monitoring system, from a first vibration sensor at a first known location in the transport vehicle and a second vibration sensor at a second known location in the transport vehicle, each of which is configured to detect vibrations from a mechanical element of the transport vehicle, a first real-time raw vibration data from the first vibration sensor and a second real-time raw vibration data from the second vibration sensor for the mechanical element, wherein the first and second real-time raw vibration data are time-synchronized;
retaining in a buffer memory of the monitoring system the first and second real-time synchronized raw vibration data for the mechanical element, wherein the data is retained in a circular memory buffer which is configured to maintain a dynamic storage of a recent raw vibration data for a designated duration of time prior to and including a current time;
monitoring for event conditions, concurrently, comprising both an automated event condition and a manual trigger action;
receiving, at a hardware processor of the monitoring system, a trigger signal for raw-data storage (TSRDS) indicative of the automated event condition comprising a flight event of the transport vehicle, the TSRDS being generated at the time of the flight event or after the flight event or the manual trigger action comprising a time of manual triggering;
upon receiving the trigger signal for raw-data storage (TSRDS), transferring the recent raw vibration data from the circular memory buffer to a non-volatile data storage of the monitoring system, wherein the method causes to be retained in the non-volatile data storage a storage of raw vibration data for the designated duration of time prior to and including a time of the TSRDS;
storing in the non-volatile data storage a received raw vibration data over a second duration of time starting substantially at the time of the TSRDS up to a specific time duration, wherein the sensing system is thereby configured to store in the non-volatile data storage a time-continuous data including substantially all the raw vibration data detected by the first and second vibration sensors over a time interval from a first time before the time of the TSRDS to a second time which is a time after the TSRDS; and
tracking, based on the first and second real-time synchronized raw vibration data, a progression of locations of the associated flight event.

7. The method of claim 6, further comprising:
receiving a plurality of real-time raw vibration data signals from a plurality of respective vibration sensors of the transport vehicle, wherein each of the plurality of vibration sensors is allocated a circular data buffer.

8. The method of claim 7, further comprising:
upon receiving the trigger signal for raw-data storage (TSRDS), retaining the plurality of real-time raw vibration data signals in a plurality of respective circular data buffers corresponding to the plurality respective vibration sensors.

9. The method of claim 7, further comprising: retaining in the non-volatile data storage the plurality of real-time raw vibration data signals from the plurality of respective vibration sensors, each respectively generated, retained raw vibration data signal being a time-continuous data including substantially all the raw vibration data detected by each respective sensor over a time interval spanning from before a time of the TSRDS to a second time which is a time after the TSRDS.

10. The method of claim 6, further comprising: retaining in the non-volatile data storage an additional data associated with the raw vibration data, wherein the retained additional data comprises at least one of time stamp data correlated with the raw vibration data and a data indicative of the vibration sensors from which the raw vibration data is received.

11. A computer-readable, non-transitory storage medium storing instructions that, when executed by a hardware processor of a monitoring system integrated into a transport vehicle, causes the hardware processor to execute a method for storing vibration data, the method comprising:
receiving at the monitoring system, from a first vibration sensor at a first known location and a second vibration sensor at a second known location, each of which is configured to detect vibrations from a mechanical element of the transport vehicle, a first real-time raw vibration data from the first vibration sensor and a second real-time raw vibration data from the second vibration sensor for the mechanical element, wherein the first and second real-time raw vibration data are time-synchronized;
retaining in a buffer memory of the monitoring system the first and second real-time synchronized raw vibration data for the mechanical element, wherein data is retained in a circular memory buffer of the monitoring system which is configured to maintain a dynamic storage of a recent raw vibration data for a designated duration of time prior to and including a current time;
monitoring for event conditions, concurrently, comprising both an automated event condition and a manual trigger action;
receiving, at the hardware processor of the monitoring system, a trigger signal for raw data storage (TSRDS)

indicative of the automated event condition comprising a flight event of the transport vehicle, the TSRDS being generated at the time of the flight event or after the flight event or the manual trigger action comprising a time of manual triggering;

upon receiving the TSRDS, transferring the recent raw vibration data from the circular memory buffer to a non-volatile data storage of the monitoring system, wherein the method causes to be retained in the non-volatile data storage a storage of raw vibration data for the designated duration of time prior to and including a time of the TSRDS;

storing in the non-volatile data storage a received raw vibration data over a second duration of time starting substantially at the time of the TSRDS up to a specific time duration, wherein the sensing system is thereby configured to store in the non-volatile data storage a time-continuous data including substantially all the raw vibration data detected by the first and second vibration sensors over a time interval from a first time before the time of the TSRDS to a second time which is a time after the TSRDS; and tracking, based on the first and second real-time synchronized raw vibration data, a progression of locations of the associated flight event through the first known location and the second known location.

12. The computer-readable, non-transitory storage medium of claim 11, wherein the method further comprises:
receiving a plurality of real-time raw vibration data signals from a plurality of respective vibration sensors of the transport vehicle, wherein each of the plurality of respective vibration sensors is allocated a circular data buffer.

13. The computer-readable, non-transitory storage medium of claim 12, wherein the method further comprises:
upon receiving the trigger signal for raw-data storage (TSRDS), retaining the plurality of real-time raw vibration data signals in a plurality of respective circular data buffers corresponding to the plurality respective vibration sensors.

14. The computer-readable, non-transitory storage medium of claim 12, wherein the method further comprises:
retaining in the non-volatile data storage the plurality of real-time raw vibration data signals from the plurality of respective vibration sensors, each respective generated, retained raw vibration data signal being a time-continuous data including substantially all the raw vibration data detected by each respective sensor over a time interval spanning from before a time of the flight event to a second time which is a time after the flight event.

15. The computer-readable, non-transitory storage medium of claim 12, wherein the method further comprises:
retaining in the non-volatile data storage an additional data associated with the raw vibration data, wherein the retained additional data comprises at least one of time stamp data correlated with the raw vibration data and a data indicative of the vibration sensors from which the raw vibration data is received.

\* \* \* \* \*